Patented Nov. 24, 1925.

1,562,834

UNITED STATES PATENT OFFICE.

PAUL W. KRUGER, OF BOYETT, MISSISSIPPI.

DENTAL CEMENT.

No Drawing.　　Application filed October 6, 1924.　Serial No. 742,083.

*To all whom it may concern:*

Be it known that I, PAUL W. KRUGER, residing at Boyett, in the county of Attala and State of Mississippi, have invented certain new and useful Improvements in Dental Cements, of which the following is a specification in such full, clear, concise, and exact terms as will enable any person skilled in the art to make, construct, compound, and use the same.

My invention relates to dental cements containing guaiacol or set with guaiacol and such cements as are described in application Ser. No. 486,809, (see Ser. No. 7408, filed February 6, 1925) of this same applicant, and more especially to the magnesium cements and those containing magnesium oxide or magnesium oxychloride. It has reference to cements that set by mixing powder and liquid together into a creamy or pasty or plastic condition in a simple way as may be done by spatulation and usually observed as to consistency desired for dental use to be workable and react together to form a hardened mass.

An object of my invention is to produce a subaqueous and non-conductive property in such dental cements and an immediate and more marked subaqueous setting property and less tendency to disintegrate during the time of setting, if flooded or in contact with saliva, than is given by guaiacol alone as the ingredient or setting liquid of the cement. Cements set with guaiacol have a tendency to disintegrate if much moisture or saliva gets in contact with the cement during the first few minutes of setting.

A further object of my invention is to produce in dental cements and particularly in the magnesium dental cements or cements of magnesium foundation or contents, that are set with guaiacol, a slower action than guaiacol alone or primarily as the setting liquid of such cements. Guaiacol alone as an only setting liquid or as the active setting liquid often sets a cement hard in a few minutes too rapidly for convenience of working.

My composition comprises a dental cement powder, guaiacol and a terebinth suitable for dental uses or fillings, which may be preferably such a terebinth as also chemically unites with the cement powder, or such as an acid resin uniting with the base of the cement powder, such as Canada balsam preferably, with a magnesium compound such as MgO in the cement powder. By adding balsam of fir or suitable terebinth in the setting liquid or with the guaiacol or by mixing the materials together with the powder, a cement of better quality for the purposes of use is produced than in using guaiacol alone or as the principal setting ingredient.

To produce a cement of strongly moisture resisting quality in setting and a particularly immediate subaqueous setting property, I prefer the use of the balsams of fir, the Canada balsam (Abies balsamea), as it is a viscid terebinth in which a hardening resin persists with a non-crystalline structure, or the resin itself may be used. I mix the balsam of fir with the guaiacol or setting liquid as the setting mixture of the cement powder in proportions appropriate for the use intended to give the subaqueous setting quality, retardation of setting or other qualities desired.

A liquid of good setting quality I can make by using one part of balsam of fir or of a terebinth, to two parts guaiacol as the setting liquid to mix with the cement powder, the proportions herein given being by weight. The powder may be a magnesium oxide or a magnesium oxide cement powder or such cement powders as described in reference herein given above.

Retardation of setting takes place somewhat in proportion to the amount of terebinth used, being slightly retarded by a small percentage of balsam of fir or amounts under fifteen per cent of the total liquid, and is considerably retarded when the amount of balsam of fir used is over seventy-five per cent of the total liquid which may make a cement very slowly harden. When using magnesium oxide as the cement powder or other cement powder mainly of magnesium oxide or of magnesium compound, I prefer to use a considerable proportion of terebinth or balsam of fir in proportion to the amount of guaiacol. When particular slowness of setting action is required to do filling work as for root-canals, a good proportion is two parts of balsam of fir to one part of guaiacol or of the active setting agent, by weight. Other proportions may be used and as it is known that Canada balsam with magnesium oxide in the presence of moisture of water, will itself harden slowly into a hardened mass, any small addition of guaiacol will still constitute a cement when the cement is one of a magnesium cement powder such as magnesium oxide and the setting liquid contains that balsam of fir. Any other or any small amount of balsam of fir incorporated with the guaiacol in the cement powder or in the setting liquid mixed with the powder also has a tendency to some corresponding effect in moisture protection to hold the cement from a tendency to disintegrate during the first minutes of setting, if saliva or water should come in contact with it. The guaiacol-balsam combination with a cement powder that sets with guaiacol, gives a more agreeably working cement, under all conditions, than guaiacol primarily as the active setting liquid. Other balsams or resins of larch, fir or pine may be used but have not the particular setting property of the Canada balsam which is best to use.

I claim:

1. A dental cement comprising a combination of a dental cement comprising a powder that can be set into a hardened cement with guaiacol, a liquid containing guaiacol in its composition, and a terebinth.

2. A dental cement comprising a dental cement powder that sets with guaiacol, and a setting liquid that contains in its composition guaiacol and a terebinth.

3. A dental cement consisting of a cement powder and a setting liquid which is guaiacol and balsam of fir.

4. A dental cement comprising a dental cement powder containing a magnesium compound that has a setting reaction with guaiacol, and a setting liquid having in its composition guaiacol and a terebinth resin in solution.

5. A dental cement comprising a dental cement powder comprising a magnesium cement powder that reacts with guaiacol to form the hardened mass, guaiacol and balsam of fir.

6. A dental cement consisting of a magnesium cement powder and a liquid which is guaiacol and a balsam of fir, with which the cement powder forms a hardened mass.

7. A dental cement comprising a cement powder containing magnesium oxide, and a setting liquid containing a liquid having guaiacol in its composition acting as a setting agent, and a terebinth in solution in the setting liquid.

8. A dental cement comprising a magnesium cement powder containing magnesium oxide, and a liquid which is guaiacol and a balsam of fir.

Signed at Boyett in the county of Attala and State of Mississippi this second day of October, 1924.

PAUL W. KRUGER.